United States Patent
Tseng

(10) Patent No.: US 9,013,715 B2
(45) Date of Patent: Apr. 21, 2015

(54) DETECTION SYSTEM AND DETECTION METHOD FOR DETECTING DISTANCE VALUE OF BACK LIGHT MODULE

(71) Applicant: Zhongshan Innocloud Intellectual Property Services Co., Ltd., Zhongshan (TW)

(72) Inventor: Yung-Chang Tseng, New Taipei (TW)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 0 days.

(21) Appl. No.: 14/183,543

(22) Filed: Feb. 19, 2014

(65) Prior Publication Data

US 2014/0240987 A1 Aug. 28, 2014

(30) Foreign Application Priority Data

Feb. 26, 2013 (TW) .............................. 102106623 A

(51) Int. Cl.
*G01B 11/14* (2006.01)
(52) U.S. Cl.
CPC ...................................... *G01B 11/14* (2013.01)
(58) Field of Classification Search
CPC .... G02B 5/3083; G02B 1/04; G02B 27/2264; G02B 5/0221; G02B 1/10; G02B 26/08; G02B 27/2207; G02B 27/2228; G02B 27/286; G02B 5/02; G02B 5/0226; G02B 5/0242; G02B 5/0278; G02B 6/0036; G02B 6/00
See application file for complete search history.

(56) References Cited

U.S. PATENT DOCUMENTS

| 2010/0060890 A1* | 3/2010 | Tsuchiya et al. ........... 356/237.5 |
| 2010/0155574 A1* | 6/2010 | Choi et al. .................... 250/205 |

* cited by examiner

*Primary Examiner* — Michael P Stafira
(74) *Attorney, Agent, or Firm* — Novak Druce Connolly Bove + Quigg LLP

(57) ABSTRACT

A detection system for detecting a distance value between a light source and a group of optical films of a back light module includes a base, a luminance detection device, a transfer device, and a distance detection device. The base is configured for supporting the light source. The luminance detection device is configured for detecting a luminance value of the light emitted from the back light module. The transfer device is configured for driving the group of optical films to move relative to the light source. The distance detection device is configured for detecting the distance between the light source and the group of optical films when a luminance value detected by the luminance detection device is equal to or larger than a provided luminance. A detection method using the above detection system is also provided.

11 Claims, 6 Drawing Sheets

DETECTION SYSTEM AND DETECTION METHOD FOR DETECTING DISTANCE VALUE OF BACK LIGHT MODULE

BACKGROUND

1. Technical Field

The present disclosure generally relates to detection technology, and particularly relates to a detection system and a detection method for detecting a distance value between a light source and a group of optical films of a back light module.

2. Description of Related Art

Back light modules are widely used as a light source for a detection instrument or a display device. Usually, a direct type backlight module includes a light source and a group of optical films facing the light source. A luminance value of the light emitted from the back light module is affected by a distance between the light source and the optical films. A detection system is needed to detect the luminance value of the light for getting optimal luminance parameters. The parameters include a number of lights in the light source, a space between the lights of the light source, types of optical films and a distance value between the light source and the optical films. Present detection system for detecting the luminance value includes a supporting frame for supporting the optical films and a base for locating the light source. The distance between the supporting frame and the base cannot be changed during detection. Therefore, if the luminance value is not matching with the demand, the distance between the supporting frame and the base cannot be adjusted to get a new luminance value.

Therefore, it is desirable to provide a detection system and detection method to overcome the above-mentioned limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
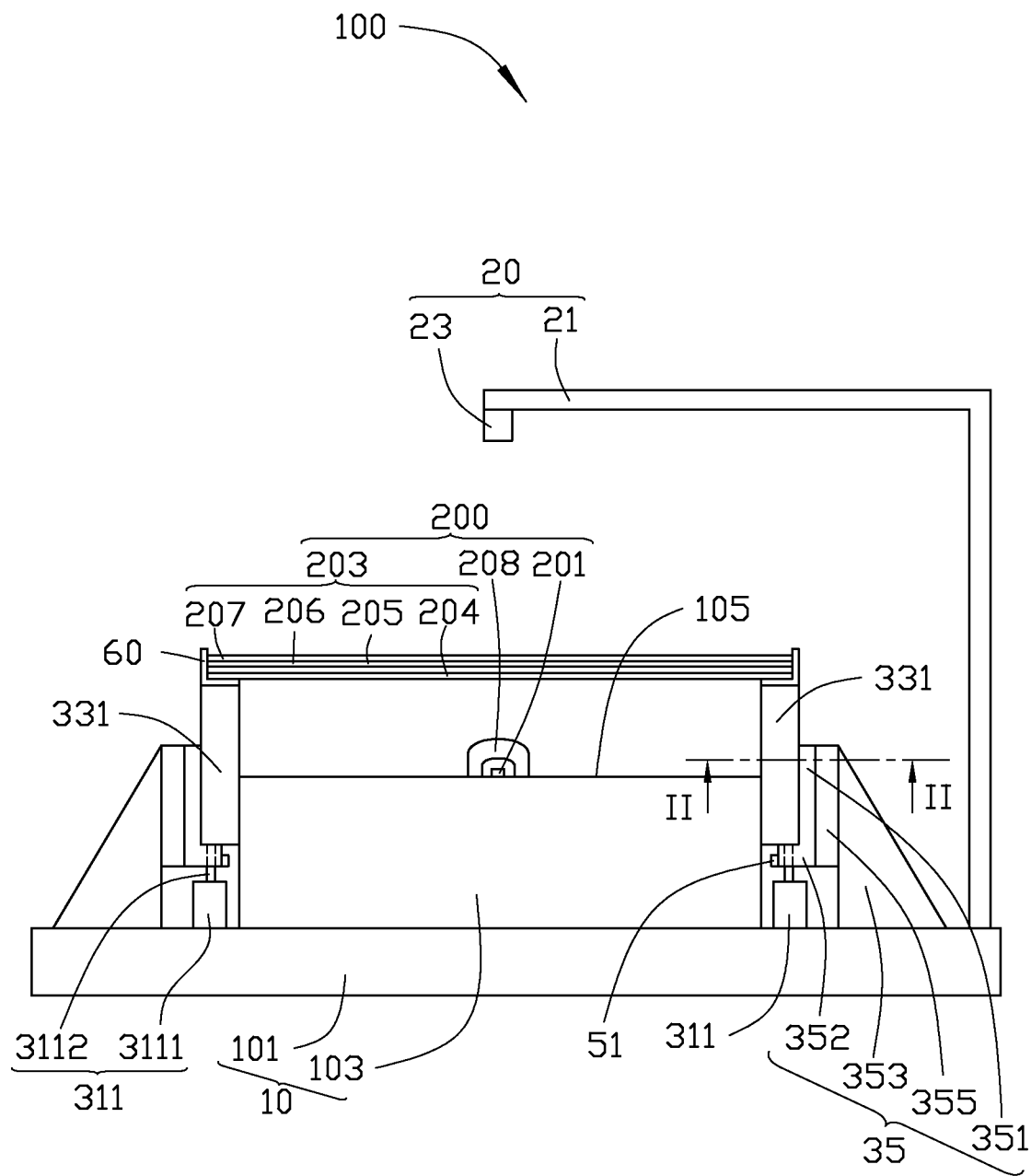
FIG. 1 shows a detection system according to a first embodiment.
Figure 2:
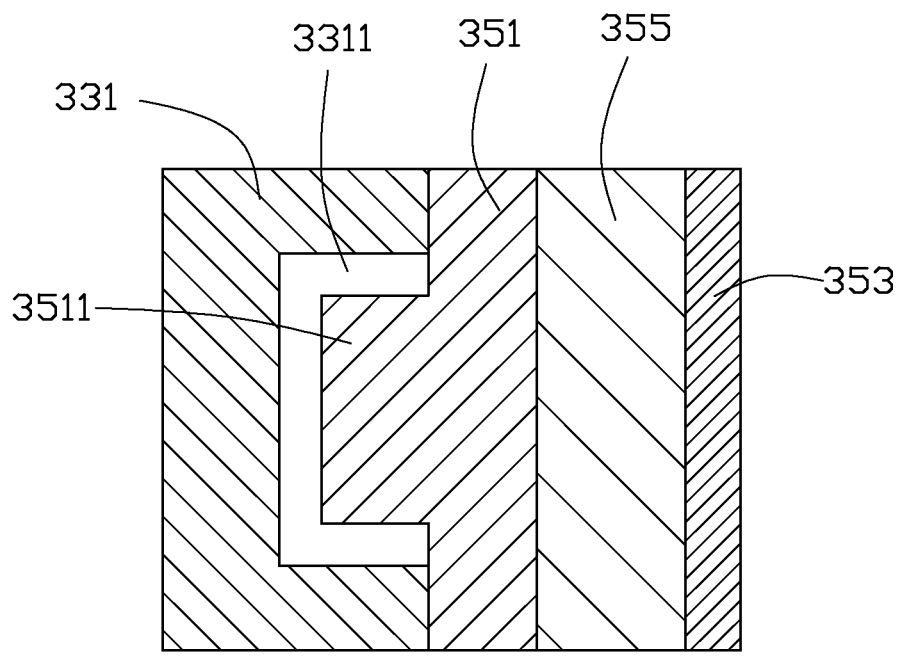
FIG. 2 is a cross-section view taken along line II-II of FIG. 1.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

FIGS. 1-5 show a first embodiment of a detection system 100. The detection system 100 is configured for detecting a distance value between a light source 201 and a group of optical films 203 of a back light module 200. The group of optical films 203 includes a lower diffusion slice 204, a lower brightness enhancement film 205, an upper brightness enhancement film 206 and an upper diffusion slice 207 in described order. The back light module 200 further includes a lens 208 above the light source 201 for diffusing light emitted from the back light module 200.

The detection system 100 includes a base 10, a luminance detection device 20, a transfer device 30, a determining device 40, and a distance detection device 50.

The base 10 is configured for supporting the light source 201. The base 10 includes a main body 101 and a supporting portion 103 positioned on the main body 101. The supporting portion 103 includes a supporting surface 105 away from the main body 101. The light source 201 is positioned on the supporting surface 105.

The luminance detection device 20 is configured for detecting a luminance value of the light emitted from the back light module 200. The luminance detection device 20 includes a supporting pole 21 and a luminance meter 23. The supporting pole 21 is positioned on the main body 101 for supporting the luminance meter 23. The luminance meter 23 is located above the back light module 200 to receive the light emitted from the back light module 200 and to detect the luminance value of the received light.

The transfer device 30 is configured for driving the group of optical films 203 to move relative to the light source 201. The transfer device 30 includes a driving unit 31, a transfer unit 33, and a supporting unit 35.

The driving unit 31 is configured for driving the transfer unit 33, then, the transfer unit 33 can move the group of optical films 203 relative to the light source 201. In the illustrated embodiment, the driving unit 31 includes two motors 311. Each motor 311 includes a stator 3111 and a telescopic pole 3112. The stator 3111 is positioned on the main body 101.

The transfer unit 33 is configured for supporting the group of optical films 203 and moving the group of optical films 203 relative to the light source 201. In the illustrated embodiment, the transfer unit 33 includes two movable supporting tables 331. The two movable supporting tables 331 are positioned on two opposite sides of the supporting portion 103. The two movable supporting tables 331 extend perpendicular to the supporting surface 105 of the supporting portion 103. Each movable supporting table 331 is connected with the telescopic pole 3112 of a corresponding motor 311. Each movable supporting table 331 can be driven to move along the extended direction of itself by the corresponding motor 311, and then the two movable supporting tables 331 can cooperatively move the group of optical films 203 relative to the light source 201.

The detection system 100 further includes a fixing frame 60 positioned on the transfer device 30 for receiving and fixing each component of the group of optical films 203.

The supporting unit 35 is configured for supporting the transfer unit 33. In the illustrated embodiment, the supporting unit 35 is positioned on the main body 101. The supporting unit 35 includes two fixed supporting tables 351 and two right angle supports 353 fixed on the main body 101.

Each fixed supporting table 351 faces and slidably connects to a corresponding movable supporting table 331. Each fixed supporting table 351 is positioned away from the supporting portion 103 relative to the corresponding movable supporting table 331. In the illustrated embodiment, the fixed supporting table 351 and the corresponding movable supporting table 331 are slidably connected by a slide rail 3511 and a slide groove 3311, thus, the movable supporting table 331 can move relative to the corresponding fixed supporting table 351. The extended direction of the slide rail 3511 and the slide groove 3311 is perpendicular to the supporting surface 105. The fixed supporting table 351 includes a supporting block 352 projecting from a side surface. The supporting block 352 is aligned with an end of the movable supporting table 331, and is correspondingly arranged in place. Each telescopic pole 3112 is movably received through a corresponding supporting block 352 and is connected to the corresponding movable supporting table 331. Thus, the corresponding movable supporting table 331 can be driven by the motor 311.

The right angle support 353 is positioned on the main body 101. Each right angle support 353 is fixed with a corresponding fixed supporting table 351. In the illustrated embodiment, each right angle support 353 is fixed to a corresponding connection block 355 with one or a number of screws, and each connection block 355 is fixed to a corresponding fixed supporting table 351 with one or a number of screws. Thus, the right angle support 353 is fixed to a corresponding fixed supporting table 351. In other embodiments, the right angle support 353 can be adhered with a corresponding fixed supporting table 351, as long as there is one supporting unit 35 on the base 10.

In other embodiments, a number of motors 311 can be one or more than two. When only one motor 311 is used, a number of movable supporting tables 331 can be driven synchronously. When only one movable supporting table 331 is used, a supporting frame may be included to support the group of optical films 203. One or more than one motor 311 can drive the supporting frame. A shape of the supporting frame can be hollow square, hollow circular, U shape, V shape, and other shapes.

Figure 3:
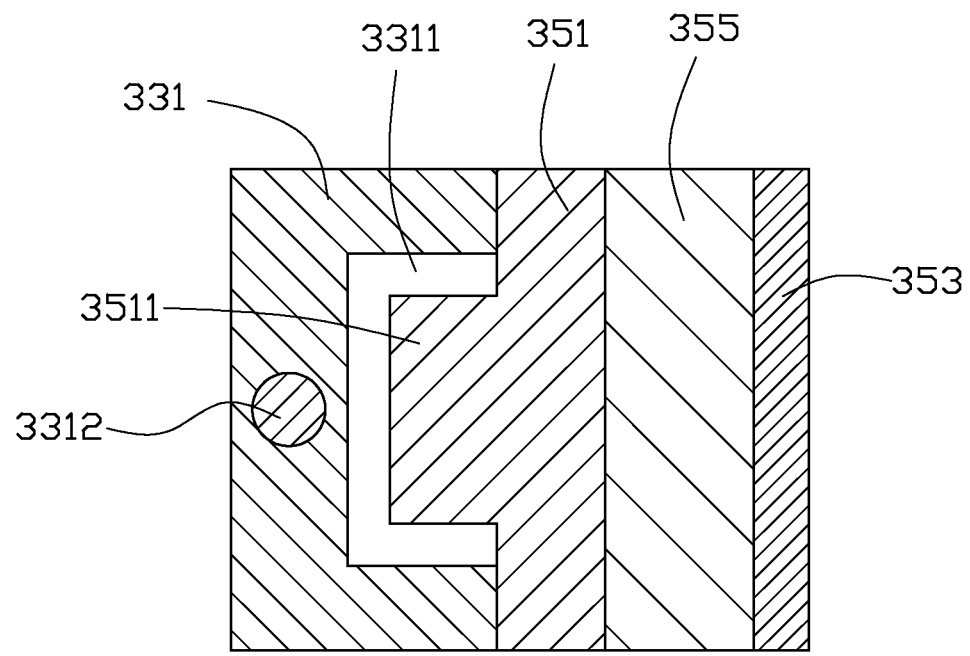
FIG. 3 is similar to FIG. 2, but further includes a screw pole.

In an alternative embodiment, the driving unit 31 can be omitted. The transfer unit 33 can be manually driven. For example, FIG. 3 shows that according to an alterative embodiment, the transfer device 30 can include two screw poles 3312 parallel with the slide rail 3511 and the slide groove 3311.

Each screw pole 3312 is rotatably connected to a corresponding movable supporting table 331 and a corresponding supporting block 352. Therefore, due to the limitation of the slide rails 3511 and the slide grooves 3311, the movable supporting table 331 can be driven by manually rotating the screw pole 3312.

Figure 4:
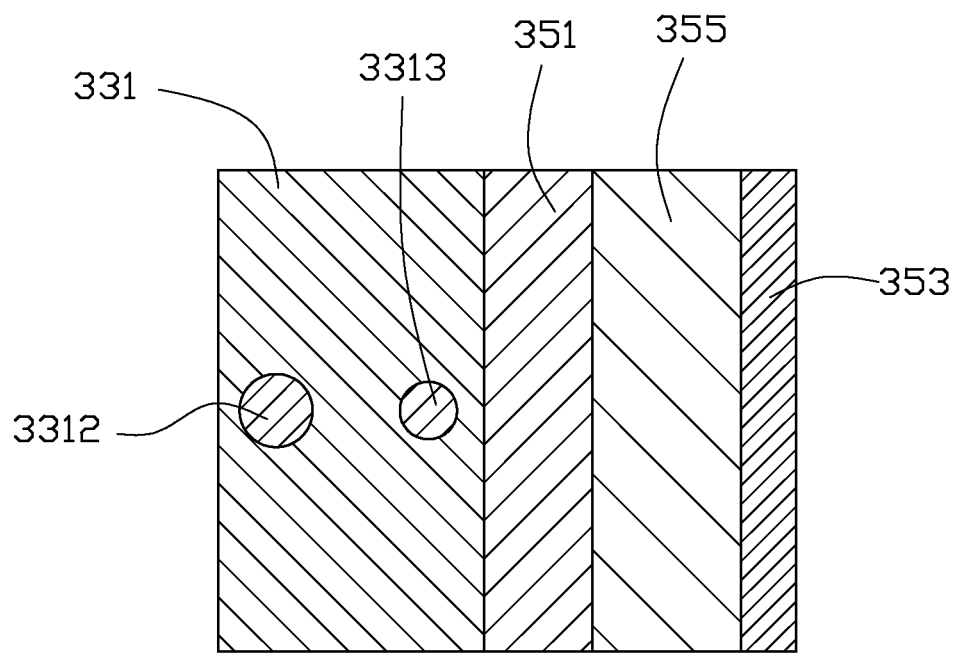
FIG. 4 is similar to FIG. 3, but further includes a guide pole.
Figure 5:
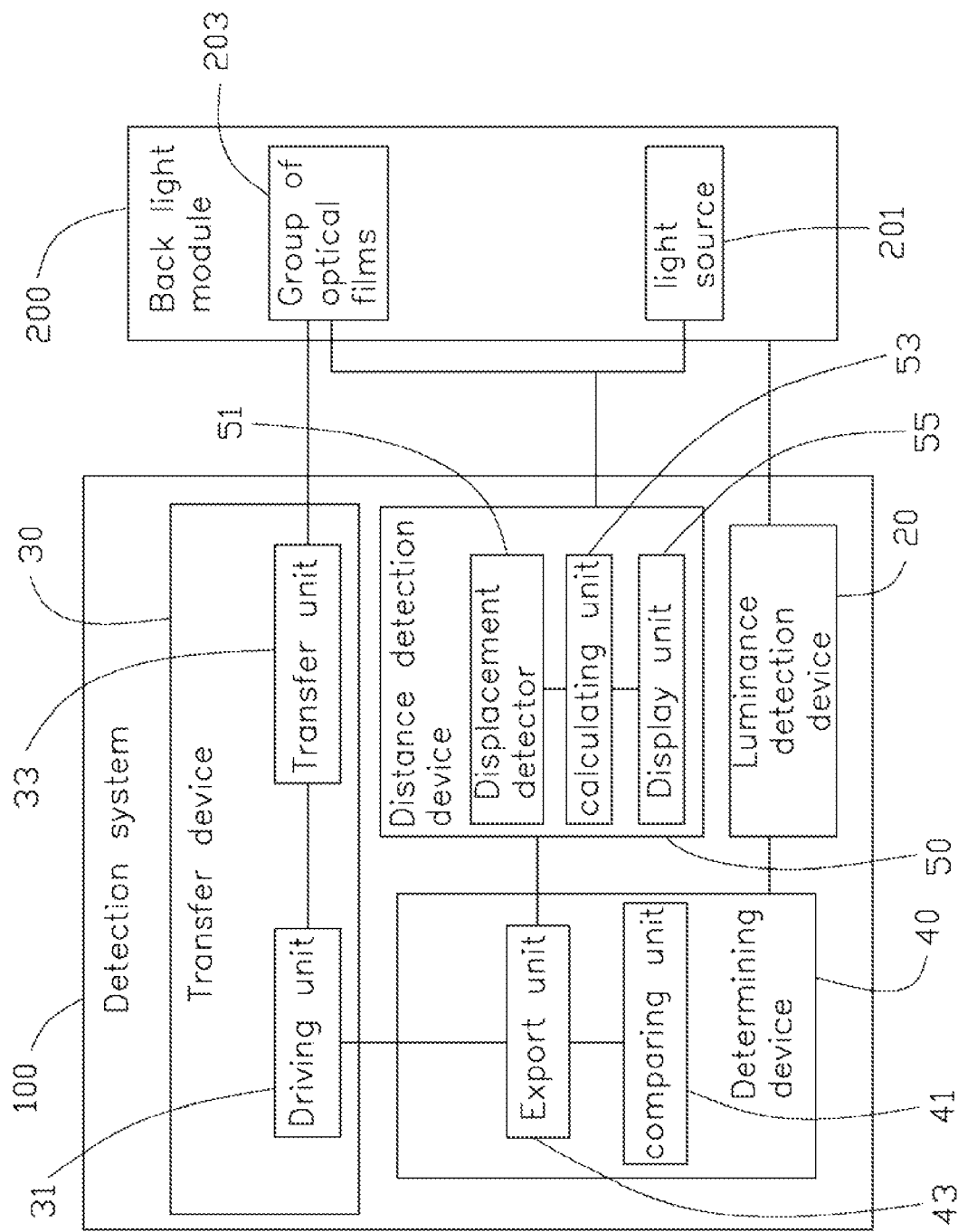
FIG. 5 is a block diagram of the detection system of FIG. 1.

FIG. 4 shows that according to another alterative embodiment, the slide rail 3511 and the slide groove 3311 can be omitted. The transfer device 30 can include two screw poles 3312 and two guide poles 3313 parallel with the screw poles 3312. Each screw pole 3312 is rotatably connected to a corresponding movable supporting table 331 and a corresponding supporting block 352. Each guide pole 3313 is movably received through a corresponding movable supporting table 331 and a corresponding supporting block 352. Therefore, due to the limitation of the guide pole 3313, the movable supporting table 331 can be driven to move along the guide pole 3313 by manually rotating the screw pole 3312.

The determining device 40 is configured for determining if a luminance value detected by the luminance detection device 20 is equal to or larger than a provided luminance value and for sending signals to the distance detection device 50 or the driving unit 31. The determining device 40 includes a comparing unit 41 and an export unit 43. A provided luminance value is saved in the compare unit 41. The determining device 40 is configured for determining if a luminance value detected by the luminance detection device 20 is equal to or larger than the provided luminance value and sending signals to the export unit 43. The export unit 43 is configured for sending signals to the distance detection device 50 or the driving unit 31. When a luminance value detected by the luminance detection device 20 is equal to or larger than the provided luminance, the compare unit 41 sends a first signal to the export unit 43. The export unit 43 sends the first signal to the distance detection device 50. The distance detection device 50 detects a distance value between the light source 201 and the group of optical films 203 of a back light module 200. When a luminance value detected by the luminance detection device 20 is less than the provided luminance, the comparing unit 41 sends a second signal to the export unit 43. The export unit 43 sends the first signal to the driving unit 31. The driving unit 31 moves the transfer unit 33, and the transfer unit 33 moves the group of optical films synchronously relative to the light source 201. That is to say, if the luminance value of the light emitted from the back light module 200 is not matching with the demand, the distance between the light source 201 and the group of optical films 203 may be changed manually and conveniently to get a new luminance value.

In an alternative embodiment, the determining device 40 can be omitted. The luminance value and the provided luminance value can be compared manually. A determination can be made manually and then, the distance detection device 50 or the transfer unit 33 can be started manually.

The distance detection device 50 is configured for detecting a current distance value between the light source 201 and the group of optical films 203 when a luminance value detected by the luminance detection device 20 is equal to or larger than the provided luminance. The distance detection device 50 includes a displacement detector 51, a calculating unit 53, and a display unit 55.

The displacement detector 51 is configured for detecting a displacement value of the movable supporting table 331 and the group of optical films, and sending a signal with the displacement value. In one embodiment, the displacement detector 51 can be an infrared detector and arranged on a surface of the supporting block 352 near the supporting portion 103. The displacement value of the movable supporting table 331 can be detected by the infrared detector receiving a reflection light from the supporting surface 105. In other embodiments, the displacement detector 51 can be arranged on a surface of the fixed supporting table 351 or a surface of the main body 101. In other embodiments, the displacement detector 51 can include a scale for manually detecting a distance value between the light source 201 and the group of optical films 203. The scale can be arranged on the fixed supporting table 351, the main body 101, or the supporting portion 103.

A starting distance value between the light source 201 and the group of optical films 203 of a back light module 200 is saved in the calculating unit 53. The calculating unit 53 is configured for receiving a displacement value from the displacement detector 51, calculating and receiving a current distance value between the light source 201 and the group of optical films 203 by adding the displacement value on the starting distance value.

The display unit 55 is configured for receiving and displaying the current distance value between the light source 201 and the group of optical films 203 calculated by the calculating unit 53.

Figure 6:
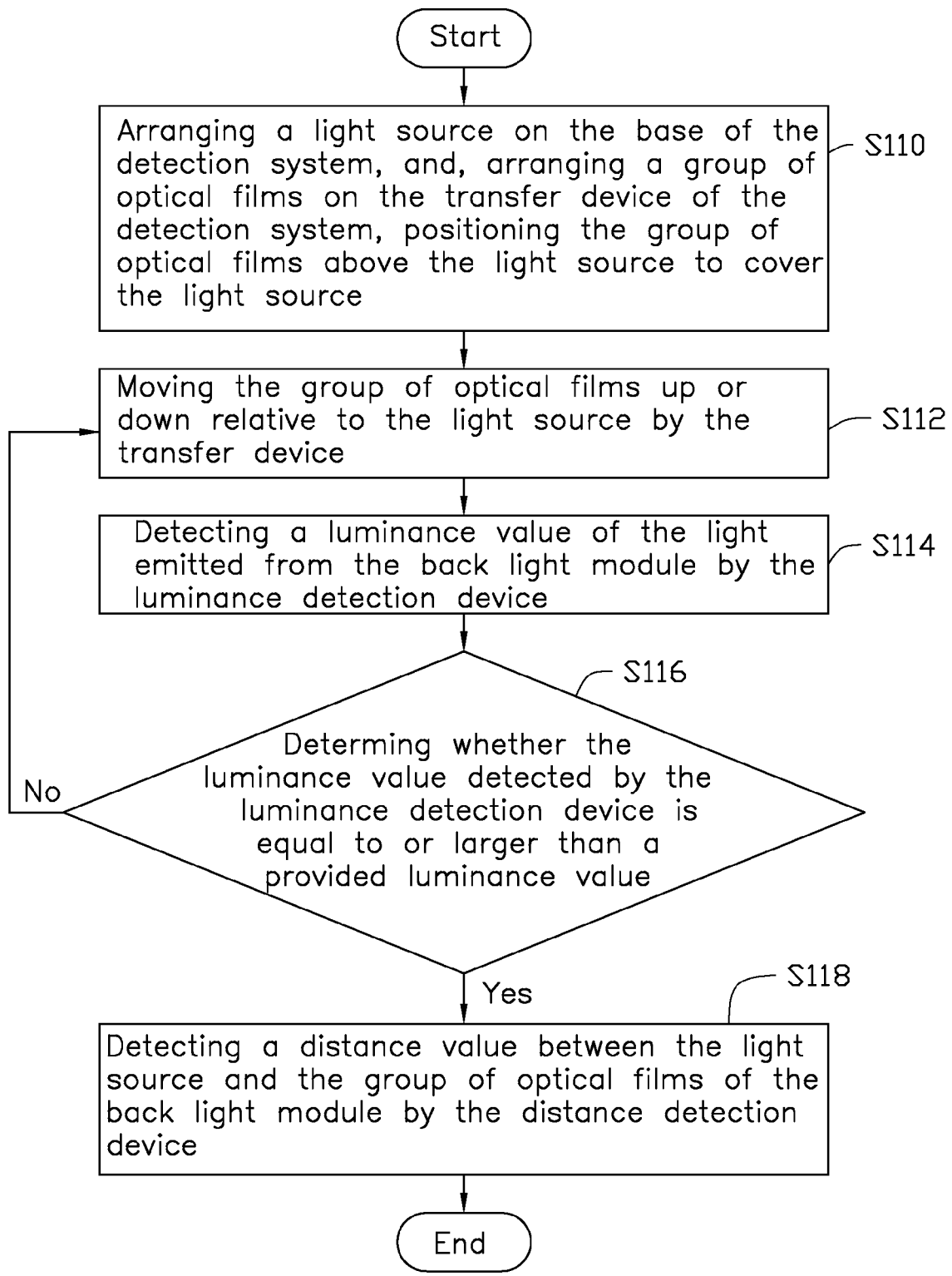
FIG. 6 is a flow diagram of a detection method for detecting a distance between a light source and a group of optical films of a back light module according to a second embodiment.

FIG. 6 shows a detection method using the above detection system 100 according to a second embodiment. The detection method includes the following steps.

In step S110, a light source 201 is arranged on the base 10 of the detection system 100 and a group of optical films 203 is arranged on the transfer device 30. The group of optical films 203 is positioned above the light source 201 to cover the light source 201.

In step S112, the group of optical films 203 is moved up or down relative to the light source 201. In the illustrated embodiment, the group of optical films 203 is driven to move by the transfer device 30.

In step S114, the luminance detection device 20 detects a luminance value of the light from the back light module 200.

In step S116, the determining device 40 determines whether the luminance value detected by the luminance detection device 20 is equal to or larger than a provided luminance value. When the luminance value detected by the luminance detection device 20 is less than the provided luminance value, the comparing unit 41 sends a second signal to the export unit 43. The export unit 43 sends the second signal to the driving unit 31, and returns to step S112.

In step S118, when the luminance value detected by the luminance detection device 20 is equal to or larger than the provided luminance value, the comparing unit 41 sends a first signal to the export unit 43. The export unit 43 sends the first signal to the distance detection device 50. The distance detection device 50 detects a current distance value between the light source 201 and the group of optical films 203 of a back light module 200.

While certain embodiments have been described and exemplified above, various other embodiments will be apparent from the foregoing disclosure to those skilled in the art. The disclosure is not limited to the particular embodiments described and exemplified but is capable of considerable variation and modification without departure from the scope and spirit of the appended claims.

What is claimed is:

1. A detection system for detecting a distance value between a light source and a group of optical films of a back light module, comprising:
    a base, configured for supporting the light source;
    a luminance detection device, configured for detecting a luminance value of light from the backlight module;
    a transfer device, wherein the transfer device supports the group of optical films and drives the group of optical films to move relatively to the light source; and
    a distance detection device, wherein the distance detection device detects the distance value between the light source and the group of optical films when the luminance value detected by the luminance detection device is equal to or larger than a provided luminance value.

2. The detection system of claim 1, further comprising a determining device, the determining device configured for determining whether the luminance value detected by the luminance detection device is equal to or larger than the provided luminance value, when the luminance value detected by the luminance detection device being equal to or larger than the provided luminance, the determining device sending a signal to the distance detection device, thereafter, the distance detection device detecting the distance value, when the luminance value detected by the luminance detection device being less than the provided luminance, the determining device sending a second signal to the transfer device, thereafter, the transfer device driving the group of optical films to move relative to the light source.

3. The detection system of claim 1, wherein the transfer device includes a driving unit and a transfer unit, the driving unit configured for driving the transfer unit, then the transfer unit capable of moving the group of optical films relative to the light source, the transfer unit including at least one movable supporting table, the at least one movable supporting table configured for supporting the group of optical films, the at least one movable supporting table being connected to the driving unit so that the driving unit capable of driving the transfer unit to move relative to the light source.

4. The detection system of claim 3, wherein the transfer device further comprise a supporting unit fixed to the base, the supporting unit configured for supporting the transfer unit, the supporting unit including at least one fixed supporting table corresponding with the at least one movable supporting table, each movable supporting table being movably connected with a corresponding fixed supporting table.

5. The detection system of claim 4, wherein each fixed supporting table and the corresponding movable supporting table are slideably connected by a slide rail and a slide groove.

6. The detection system of claim 4, wherein each fixed supporting table and the corresponding movable supporting table are slideably connected by a guide pole movably received through the movable supporting table and the fixed supporting table.

7. The detection system of claim 4, wherein the supporting unit further includes at least one right angle support, the at least one right angle support is arranged on the base, each fixed supporting table corresponds to and is fixed to a right angle support.

8. The detection system of claim 1, wherein the distance detection device further includes a scale for manually detecting a distance value between the light source and the group of optical films.

9. The detection system of claim 1, further comprising a fixing frame configured for receiving the group of optical films, the fixing frame being positioned on the transfer device, the transfer device bringing the fixing frame and the group of optical films received in the fixing frame to move relative to the light source.

10. A detection method using the detection system in claim 1 for detecting a distance value between a light source and a group of optical films of a back light module, comprising:
    arranging a light source on the base of the detection system, and arranging a group of optical films on the transfer device of the detection system, positioning the group of optical films above the light source to cover the light source;
    moving the group of optical films up or down relative to the light source by the transfer device;
    detecting a luminance value of the light emitted from the back light module by the luminance detection device;
    determining whether the luminance value detected by the luminance detection device is equal to or larger than a provided luminance value; and
    detecting the distance value between the light source and the group of optical films by the distance detection device when the luminance value detected by the luminance detection device being equal to or larger than the provided luminance value.

11. The detection method of claim 10, further comprising turning to the step of moving the group of optical films up or down relative to the light source by the transfer device when the luminance value detected by the luminance detection device being less than the provided luminance value.

* * * * *